United States Patent [19]

Eda

[11] Patent Number: 4,670,811
[45] Date of Patent: Jun. 2, 1987

[54] DIFFERENTIAL-TYPE PROTECTIVE RELAY

[75] Inventor: Nobuo Eda, Hyogo, Japan

[73] Assignee: Mitsubishi Denki Kabushiki Kaisha, Tokyo, Japan

[21] Appl. No.: 683,493

[22] Filed: Dec. 19, 1984

[30] Foreign Application Priority Data

Feb. 27, 1984 [JP] Japan ................................. 59-35548

[51] Int. Cl.4 ............................................ H02H 3/26
[52] U.S. Cl. ..................................................... 361/45
[58] Field of Search ............................... 361/42, 44–50

[56] References Cited

U.S. PATENT DOCUMENTS

| 3,218,516 | 11/1965 | Sharp | 361/63 |
|---|---|---|---|
| 3,488,559 | 1/1970 | Souillard | 361/47 |
| 3,633,070 | 1/1972 | Vassos et al. | 361/46 |
| 3,732,463 | 5/1973 | Dale | 361/45 |
| 3,962,606 | 6/1976 | Burns et al. | 361/45 |
| 4,081,852 | 3/1978 | Coley et al. | 361/45 |
| 4,208,690 | 6/1980 | McGinnis et al. | 361/48 |
| 4,258,403 | 3/1981 | Shimp | 361/42 |
| 4,344,100 | 9/1982 | Davidson et al. | 361/45 |

FOREIGN PATENT DOCUMENTS

| 2216377 | 9/1974 | Fed. Rep. of Germany . | |
|---|---|---|---|
| 5012571 | 11/1975 | Japan . | |
| 5743019 | 4/1982 | Japan . | |
| 0847427 | 7/1981 | U.S.S.R. | 361/42 |
| 1091270 | 5/1984 | U.S.S.R. | 361/47 |

Primary Examiner—A. D. Pellinen
Assistant Examiner—A. Jonathan Wysocki
Attorney, Agent, or Firm—Bernard, Rothwell & Brown

[57] ABSTRACT

In a differential-type protective relay actuated to generate a signal necessary for the protection of a bus of an electric power system when a troubled current has flown through the bus, a gapped first transformer is used to receive an output from a current transformer which is adapted to detect each current in the bus. Each output of a first detection element, which is actuated when the output of the first transformer is higher than a preset level, is fed out to the exterior only when a value obtained by subtracting the sum of the maximum of the output of the first transformer and the value of a signal obtained by shifting the phase of the output through a predetermined angle from the value of a signal obtained by subjecting the output of the first transformer to full-wave transformation is equal to or lower than a preset value.

3 Claims, 4 Drawing Figures

DIFFERENTIAL-TYPE PROTECTIVE RELAY

BACKGROUND OF THE INVENTION

1. Field of the Invention

This invention relates to an improvement in or relating to differential-type protective relays suitable for application to electric power systems so as to protect the buses of the electric power systems or various apparatus, equipment, devices and/or the like connected to the buses.

2. Description of the Prior Art

Taking by way of example protective relays adapted to protect buses, there have conventionally been known such protective relays as illustrated diagrammatically in FIG. 1.

In the figure, there are shown a bus 1, a main relay 2, outgoing lines 11, 21, current transformers 12, 22 provided respectively with the outgoing lines 11, 21, input devices or transformer units 13, 23 connected respectively to the current transformers 12, 22, differential input transformers 13-1, 23-1, restraining input transformers 13-2, 23-2, restraining voltage rectifiers 13-3, 23-3, an operating voltage input transformer 2-1, a restraining/controlling input transformer 2-2, an operating voltage rectifier 2-3, a restraining/controlling rectifier 2-4, an operating voltage output resistor 2-5, a restraining/controlling voltage output resistor 2-6, a restraining voltage output resistor 2-7, a restraining voltage stretching capacitor 2-8 and a level detector 2-9.

The operation of the above protective relay will next be described. In the circuit illustrated in FIG. 1, differential currents $I_D$ which have been induced respectively in the secondary windings of the differential input transformers 13-1, 23-1 are fed to the main relay 2. The differential current $I_D$ fed to the main relay 2 is then caused to flow through the operating voltage input transformer 2-1 and operating voltage rectifier 2-3 to the operating output resistor 2-5, where it produces an operating voltage $|E_O|$. At the same time, the differential current $I_D$ fed to the main relay 2 is also caused to pass via the restraining/controlling input transformer 2-2 and restraining/controlling rectifier 2-4 to the restraining-/controlling voltage output resistor 2-6, where it produces a restraining/controlling voltage $|E_P|$. On the other hand, by way of the restraining input transformers 13-2, 23-2 and restraining voltage rectifiers 13-3, 23-3 of the input transformer units 13, 23, the maximum currents of the secondary currents of the current transformers 12, 22 connected to their respective terminals are introduced as a terminal restraining voltage $|E_T|$ to the main relay 2. The terminal restraining voltage $E_T$ and the above-mentioned restraining/controlling voltage $|E_P|$ are instantaneously compared in value, thereby outputting the remainder obtained by subtracting the restraining/controlling voltage $|E_P|$ from the terminal controlling voltage $|E_T|$ as a final restraining voltage $|E_R|$ to the restraining voltage output resistor 2-7. The restraining voltage $|E_R|$ is stretched over a suitable period of time by the restraining voltage stretching capacitor 2-8. The main relay 2 is designed in such a way that it permits actuation and output of the level detector 2-9 when the operating voltage $|E_O|$ is high relative to the restraining voltage $|E_R|$. When an internal fault has been developed in the bus, the differential current $I_D$ is generated and the operating voltage $|E_O|$ is then produced at the operating voltage output resistor 2-5 of the main relay 2. On the other hand, the terminal restraining voltage $|E_T|$ is supplied to the main relay 2. However, the restraining/controlling voltage $|E_P|$ occurred from the differential current $I_D$ has already been impressed to the both ends of the restraining/controlling voltage output resistor 2-6 at this stage. Thus, the restraining/controlling voltage $|E_P|$ acts in such a way that it suppresses the terminal restraining voltage $|E_T|$. In case of an internal fault, the secondary currents of the current transformers 12, 22 provided at the side of the incoming terminals have waveforms similar to the differential current $I_D$. Where many incoming terminals are provided, the differential current $I_D$ is higher than any terminal current. Hence the restraining/controlling voltage $|E_P|$ occurred in proportion to the differential current $I_D$ becomes higher than the terminal restraining voltage $|E_P|$ generated in proportion to the maximum value of the secondary currents of the current transformers 12, 22 provided at the side of the incoming terminals. Correspondingly, the terminal restraining voltage $|E_T|$ is always eliminated the restraining voltage $|E_P|$ is lowered to zero, thereby ensuring fail-free actuation of the main relay 2.

Turning next to an external fault, the current transformers 12, 22 provided at the side of the incoming terminals are saturated to generate an erroneous differential current $I_D$, whereby producing in some instances the operational voltage $|E_O|$ at the operating voltage output resistor 2-5 of the main relay 2. Therefore, the restraining voltage $|E_R|$ is required to avoid any malfunction. As is well known in the art, a current transformer is extremely susceptible to saturation when a current containing a dc component is fed thereto. Therefore, such a current transformer is most likely to undergo erroneous actuation where a current contains an attenuating transient direct current component at the time of an external fault. The response of a conventional relay under the above-described situation will next be described with reference to a waveform diagram illustrated in FIG. 2.

In FIG. 2, the waveform A corresponds to a summed current from the current transformers provided at the side of the incoming terminals. The dotted line indicates a current under unsaturation, while the solid wave represents an actual secondary current of each of the current transformers. Since more than one incoming terminal is provided, a fault current is divided to the current transformers. The current transformers are thus saturated respectively by direct currents, although their degrees of saturation are low. The waveform B indicates the waveform of a secondary current induced by each of the current transformers provided at the side of the incoming terminals. The dotted line corresponds to unsaturation, while the solid line indicates an actual secondary current of each of the current transformer. Since the outgoing terminal is concentrated with the fault current, the alternative-current saturation becomes dominant. The waveform C corresponds to the terminal restraining voltage $|E_T|$, which is proportional to the maximum value among all the secondary currents. Supposing that two or more terminals are provided at the incoming side and no restraining force is expected from the current transformers provided at the side of the incoming terminals, the terminal restraining voltage derived only from the secondary currents of the current transformers provided at the side of the incoming terminals is shown there. Therefore, the waveform C has been produced from the waveform B. The voltage output from the restraining input transformer of the input transformer unit, which restraining input transformer generates the terminal restraining voltage $|E_T|$, has a waveform obtained by differentiating the primary current and the dc component of the primary current has been eliminated, because the restraining input transformer is composed of a gapped transformer in order to avoid direct-current saturation. The waveform D represents the erroneous differential current $I_D$ and has been obtained by subtracting the waveform B from the waveform A. The negative erroneous differential current of the waveform D is the direct-current saturation error of the transformers, which are provided at the side of the outgoing terminals, in the unsaturated range of the same transformers. The negative error of the waveform D becomes greater as the degrees of direct-current saturation of the transformers provided the side of the incoming terminals increase. The waveform E corresponds to the restraining/controlling voltage $|E_P|$. It has been produced from the waveform D. It is necessary to preset the phase of the voltage $|E_T|$ equal to the phase of the voltage $|E_P|$ because an operation has to be performed to eliminate the terminal restraining voltage $|E_T|$ in the event of an internal fault as described above. Accordingly, the restraining/controlling input transformer 2-2 is also composed of a gapped transformer. The secondary output voltage of the transformer 2-2 has a waveform obtained by differentiating the current input to the transformer 2-2. The waveform F represents the restraining voltage $|E_R|$. This restraining voltage $|E_R|$, which is hatched, has been obtained by stretching by the capacitor 2-8 a voltage obtained by subtracting the waveform E from the waveform C and occurred at both ends of the restraining output resistor 2-7. The waveform G corresponds to the operational voltage $|E_O|$ and is proportional to a waveform obtained by subjecting the waveform D to full-wave rectification.

As described above, the erroneous differential current $I_D$ and terminal restraining voltage $|E_T|$ which are impressed to the main relay 2 when the saturation of the current transformers has occurred due to an external fault have such waveforms as indicated respectively by the waveform C and waveform D of FIG. 2. As a result, the operational voltage $|E_O|$ and restraining voltage $|E_R|$ of the main relay 2 have waveforms similar to the waveform F and waveform G. The voltage applied to the level detector 2-9, which voltage governs the operation of the main relay 2, is thus the voltage difference between the waveform G and waveform F. Therefore, the restraining voltage indicated by the hatches on the waveform F serves as an actual restraining force in order to avoid any malfunction. The magnitude of the restraining voltage and the stretching characteristic of the capacitor 7 determine the performance for the prevention of malfunctions.

Since conventional protective relays are constructed as described above, the level of the restraining voltage $|E_R|$ upon occurrence of an external fault is affected greatly by the characteristic of the capacitor 2-8. When a troubled current has long dc attenuating time and the second or third wave component of the secondary current of each of the current transformer provided at the side of the incoming terminals is small, the second or third wave component of the terminal restraining voltage $|E_T|$ becomes smaller. As a result, the restraining voltage $|E_R|$ becomes smaller, thereby developing the danger of a malfunction. Furthermore, in order to prevent malfunctions upon occurrence of an external fault, it is necessary to use a gapped transformer as the terminal restraining input transformer of the input transformer unit so that the input transformer is not saturated with a direct current. On the other hand, it is also required to compose the restraining/controlling input transformer with a gapped transformer in order to eliminate the terminal restraining voltage $|E_T|$ without failure upon occurrence of an internal fault, whereby to ensure the perfect matching in phase. However, this has resulted in another drawback because it is difficult to match the time constant (L/R) of a circuit with that of another circuit by adjusting the time constants of parts making up both circuits.

SUMMARY OF THE INVENTION

An object of this invention is to provide a differential-type protective relay featuring extremely little danger of malfunction upon occurrence of external faults, in other words, high operational reliability upon occurrence of internal faults which are generally developed by mutually-contradictory causes.

Another object of this invention is to provide a differential-type protective relay which materially reduces the size of its input transformer unit and its manufacturing cost.

A differential-type protective relay according to this invention comprises a current transformer provided with an outgoing line connected to a bus to be protected; input devices including a first transformer, which is gapped and generates a first signal corresponding to each output from the current transformer, and a second transformer adapted to subject the first signal to full-wave rectification so as to produce a second signal; first detection means for generating an output when the level of the differential output obtained by vector composition of the first signal is higher than a preset value; means for generating a main restraining/controlling output voltage in proportion with a differential voltage; means for producing an auxiliary restraining/controlling output voltage which is proportional with the differential voltage and has a phase shifted through a predetermined angle from the phase of the first signal; second detection means capable of generating an output and holding said output for a predetermined period of time when a value obtained by subtracting a value equivalent to the sum or maximum value of the main and auxiliary restraining/controlling output voltages from the value of the second signal is equal to or higher than a preset value; and gate means for restraining the output of the first detection means while the outputs of the first and second detection means are supplied.

The gapped input transformer which receives the output of the current transformer is not saturated by a direct-current component contained in the output of the current transformer, as well as no direct current component is transmitted to the secondary output, thereby preventing the transformer used in the secondary circuit of the gapped transformer from being saturated with direct-current component. This makes it possible to use a gapless transformer, resulting in permitting use of a small transformer and hence achieving the overall size reduction of the input transformer unit.

In addition, even if the current transformer has reached saturation with a direct-current component having long attenuation time and contained in a troubled current upon occurrence of an external fault, the danger of malfunctions can extremely be reduced because the time at which the output of the first detection means, which operates upon detection that a differential voltage is produced, is earlier than the time at which the output of the second detection means which locks the output of the first detection means when the instantaneous value of the second signal corresponds to the absolute value of the first signal, and because the output of the second detection means is held for a predetermined period of time.

DETAILED DESCRIPTION OF THE PREFERRED EMBODIMENTS

Figure 1:
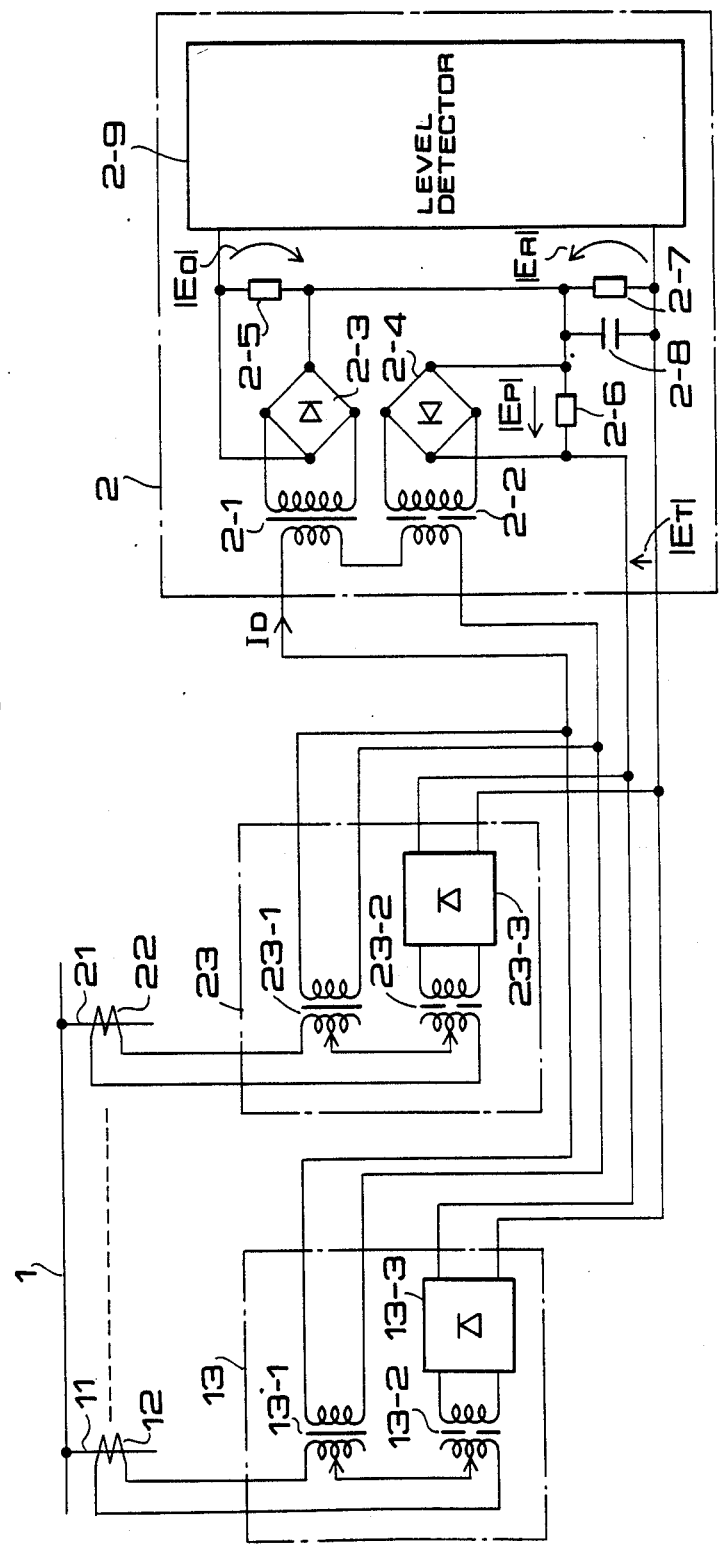
FIG. 1 is a circuit diagram showing a conventional differential-type protective relay.
Figure 3:
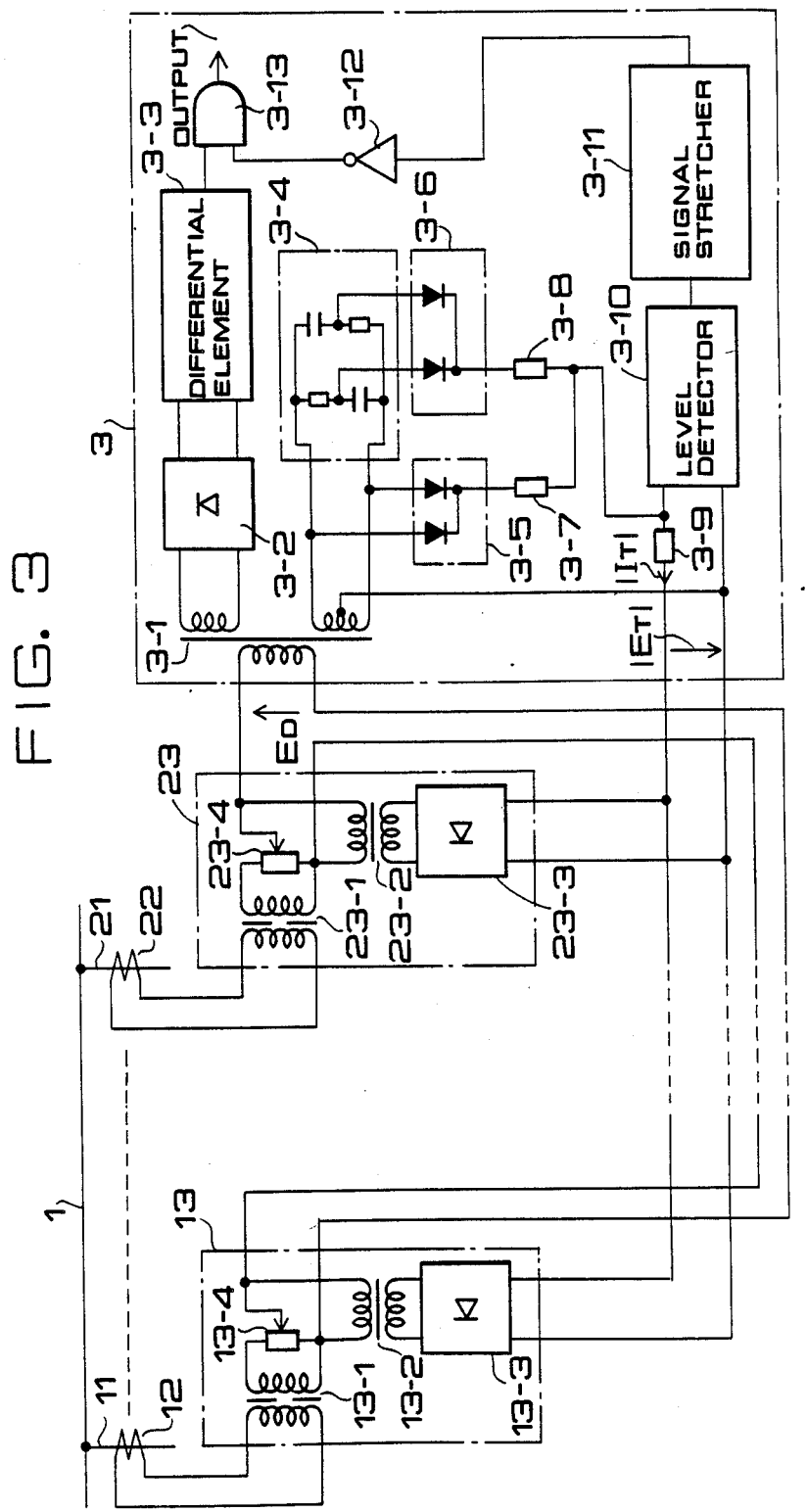
FIG. 3 is a circuit diagram showing a differentialtype protective relay according to this invention.

One embodiment of this invention will hereinafter be described with reference to the circuit diagram of FIG. 3. The structure of the differential-type protective relay according to this embodiment will be described first of all. In the figure, numerals 1, 11, 12, 13, 13-3, 21, 22 and 23-3 identify like elements of structure in FIG. 1. In FIG. 3, there are illustrated terminal input transformers 13-1, 23-1 terminal restraining output transformers 13-2, 23-2, terminal output resistors 13-4, 23-4, a main relay 3, an input transformer 3-1, an operational output rectifier 3-2, a differential element 3-3, a phase shifter 3-4 for auxiliary restraining/controlling output voltages, a rectifier 3-5 for main restraining/controlling output voltages, a rectifier 3-6 for auxiliary restraining/controlling output voltages, output resistors 3-7 and 3-8 respectively for main and auxiliary restraining/controlling outputs, an output resistor 3-9 for terminal restraining outputs, a level detector 3-10, a signal stretcher 3-11, a NOT circuit 3-12 and an AND circuit 3-13.

The output of the terminal restraining voltage $|E_T|$, which output occurs upon saturation of the current transformers 12, 22, has been increased by composing the terminal input transformers 13-1, 23-1 with gapped transformers so as to avoid saturation of the terminal input transformers 13-1, 23-1 by dc-component currents contained in the secondary currents of the current transformers 12, 22 and at the same time, by using as an output a voltage proportional to a value obtained by differentiating the ac-component current. Conventionally, a tap lead was provided with the secondary winding of an input transformer unit in order to match the current transformation ratios of the two current transformers 12, 22. Such a tap lead requires lead wires suitable respectively for the magnitudes of the secondary currents of the current transformers 12, 22, leading to unavoidable enlargement of its wiring part. Therefore, this invention renders the terminal input transformers 13-1, 23-1 tapless. Reflecting this, the secondary wirings of the terminal input transformers 13-1, 23-1 serve as voltage sources free of dc components. The terminal restraining output transformers 13-2, 23-2 can thus lower the saturation voltages, thereby permitting significant size reduction. Hence, the terminal restraining output transformers 13-2, 23-2 may be mounted on a printed circuit board, along with the rectifiers 13-3, 23-3 and terminal output resistors 13-4, 23-4. Incidentally, the terminal output resistors 13-4, 23-4 are provided with voltage divider taps so as to match their current transformation ratios with each other. Thus, the voltage divider taps are allowed to substitute for conventional tap leads for the secondary windings of transformers. The resistance levels of the terminal output resistors 13-4, 23-4 are coordinated in time resistance (L/R) with the secondary reactances of the terminal input transformers 13-1, 23-2, thereby making it sure not to deleteriously affect the characteristic by which the direct-current components contained in the secondary currents of the current transformers are removed.

The operation of the differential-type protective relay according to the above-described embodiment of this invention will next be described. Output voltages proportional to variations of the secondary currents of the current transformers 12, 22 are led respectively to the terminal output resistors 13-4, 23-4 of the input transformer units 13, 23. These outputs are then combined in series with respect to all the terminals, and are then introduced as a differential voltage $E_D$ to the input transformer 3-1 of the main relay 3. On the other hand, voltages of absolute values proportional respectively to variations of the secondary currents of the current transformers 12, 22 are introduced as terminal restraining voltages $|E_T|$ to the secondaries of the rectifiers 13-3, 23-3 of the input transformer units 13, 23. The resulting voltage is then fed to the main relay 3. The secondaries of the rectifiers are connected in parallel to each other. The main relay 3 is, similar to conventional main relays, of the maximum value restraining type, in which the main relay performs the restraining operation on the basis of the maximum current out of the secondary currents of ,the current transformers. The restraining current to be introduced to this main relay is called the terminal restraining voltage and is represented by $|E_T|$.

The main relay 3 outputs an operational output when the differential element 3-3 is actuated by the occurrence of a differential voltage ED while the output of the NOT circuit 3-12 is rendered high by development of an internal fault. In the event of an external fault, the NOT circuit 3-12 is rendered to lock the operation of the AND circuit 3-13. The phase shifter 3-4, rectifier 3-5, rectifier 3-6, output resistor 3-7 and output resistor 3-8 serve to eliminate the terminal restraining voltage $|E_T|$ upon occurrence of an internal fault in the main relay 3, thereby allowing the relay to actuate fully. Namely, upon occurrence of an internal fault, the terminal restraining voltage $|E_T|$ occurs along with the differential voltage $E_D$. The main restraining/controlling output voltage $|E_P|$ which is proportional to the differential voltage E is generated on the output of the rectifier 3-5. In the event of an internal fault, the following inequality is established because the main restraining/controlling output voltage $|E_P|$ proportional to the differential voltage $E_D$ is always higher than the terminal restraining voltage $|E_T|$ proportional to the secondary current of each of the current transformers 12, 22:

$$|E_T| - |E_P| < 0.$$

Under this condition, the level detector 3-10 does not actuate. When the phases of the secondary currents of the current transformers provided at the side of the incoming terminals are offset upon occurrence of an internal fault, the terminal restraining voltage $|E_T|$ may not be completely eliminated by the main restraining-/controlling output voltage $|E_P|$ only. Thus, the phase shifter 3-4, rectifier 3-6 and output resistor 3-8 are provided as a countermeasure for the above situation. Owing to the overlapping of the auxiliary restraining-/controlling output voltage $|E_{P'}|$ the phase of which is shifted suitably from the voltage $|E_P|$, the elimination of the terminal restraining voltage $|E_T|$ is ensured without any failure. This problem is common to conventional protective relays. Some countermeasure is necessary for the problem.

Figure 2:
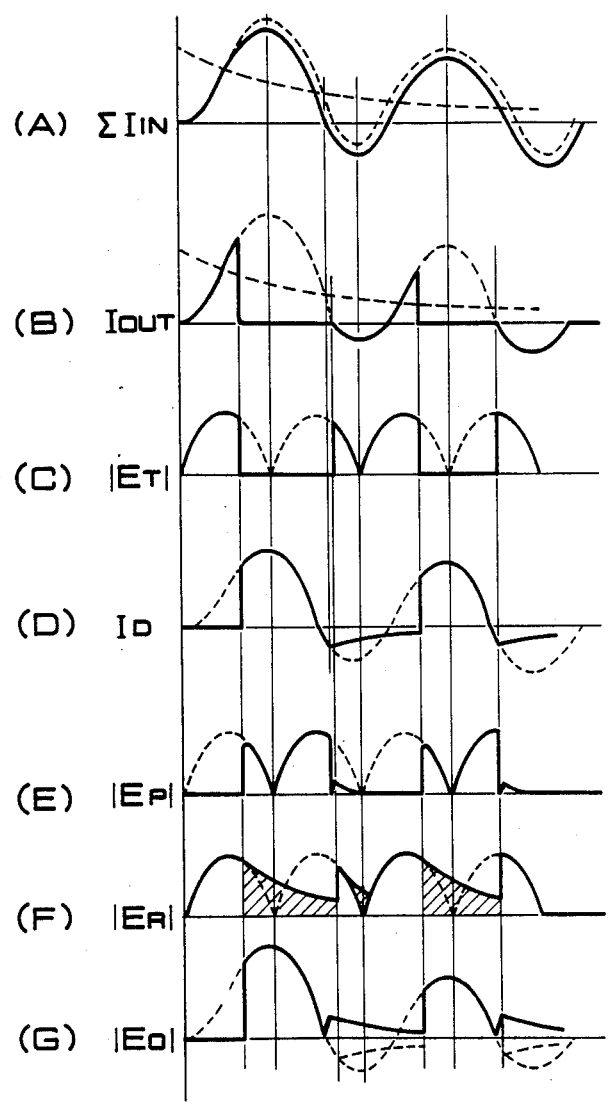
FIG. 2 is a diagram of the waveforms of various signals produced in the protective relay of FIG. 1 upon occurrence of an external fault.
Figure 4:
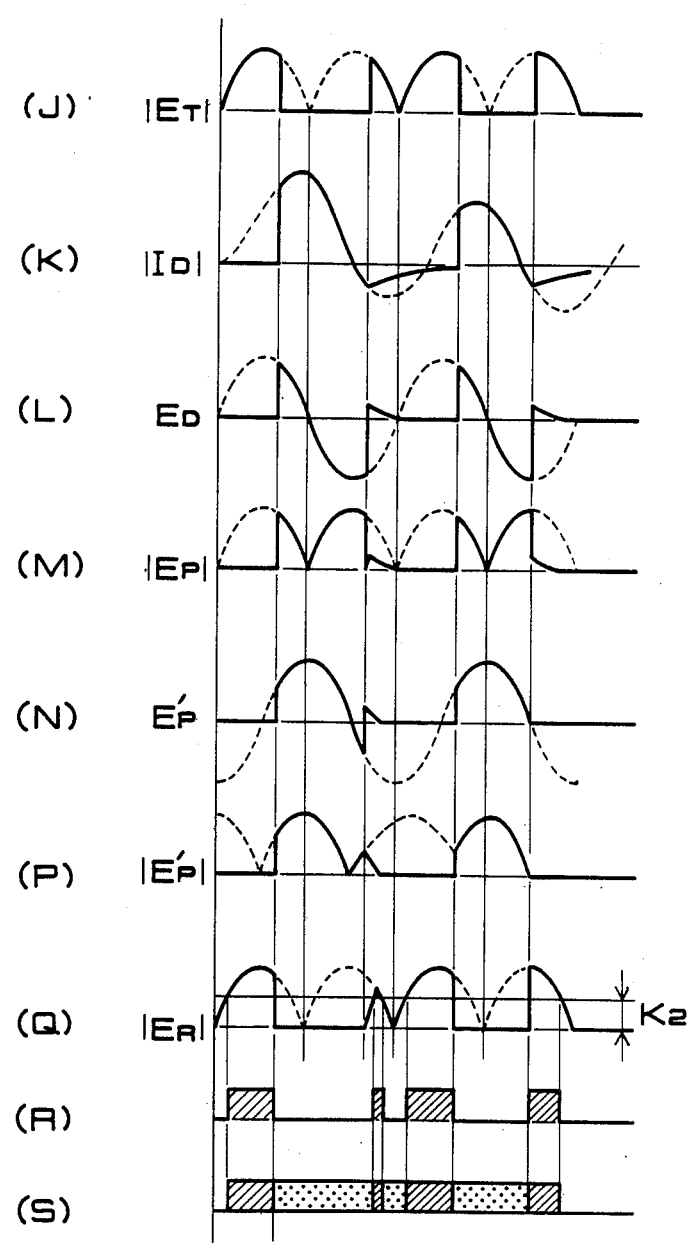
FIG. 4 is a diagram of the waveforms of various signals produced in the protective relay of FIG. 3 upon occurrence of an external fault.

Turning next to an external fault, it is necessary upon occurrence of such as external fault to have the level detector 3-10 actuate so that the AND circuit 3-13 is locked without failure. The danger of malfunction by an external fault becomes greatest when similar to the above-described conventional protective relay, a direct-current component is combined with the troubled current and the current transformers 12, 22 are saturated to extreme degrees. The operation of the protective relay according this invention under the above situation will next be described with reference to FIG. 4. The waveform of a current fed to an incoming terminal and that of a current developed at an outgoing terminal are the same as the waveforms A and B in the conventional relay. The difference between the sum of the secondary currents developed at the above time point by the current transformers provided at the side of the incoming terminals and the secondary current occurred at the same time point in the transformer provided at the side of the outgoing terminal, in other words, the erroneous differential current $I_D$ has the waveform K of FIG. 4. The waveform J corresponds to the terminal restraining voltage $|E_T|$. Although this waveform J is the same as the waveform C of the conventional relay which waveform C is shown in FIG. 2, the erroneous differential voltage $E_D$ applied to the input transformer 3-1 of the main relay 3 has a waveform similar to the waveform L. Since the input transformers 13-1, 23-1 provided at the side of the incoming terminals in the input transformer units 13, 23 are composed of gapped transformers, this waveform L is a waveform obtained by differentiating the secondary current of the current transformer and becomes equal to a waveform obtained by differentiating the waveform K. The waveform M corresponds to the main restraining/controlling output voltage $|E_P|$ and is a waveform obtained by subjecting the waveform L to full-wave rectification. The waveform N shows an output from the phase shifter 3-4. In this embodiment, the waveform N is a waveform obtained by shifting the phase of the waveform L through an angle of 90 degree. The waveform P has been obtained by subjecting the waveform N to full-wave rectification. The waveform Q corresponds to the final rectifying voltage $|E_R|$, and has been obtained by subtracting the waveforms M and P from the waveform J. This final rectifying voltage $|E_R|$ is impressed to the level detector 3-10. By the way, for the sake of simplification of the diagram, the waveform of the voltage saturating the current transformer is supposed to have absolutely no output at the initiation of the saturation and variations at the initiation of the saturation are omitted from the differentiated waveform in the waveform diagram depicted in FIG. 4. However, such simplification does not give any influence from the theoretical standpoint. The following is an operational equation for deriving the waveform Q:

$$\{|E_T| - K_1(|E'_P| + |E_{P'}|)\}^+ > K_2$$

where $K_1$, $K_2$ are both constants. When $|E'_P|$ and $|E_{P'}|$ are greater than $|E_T|$, the final restraining voltage $|E_R|$ acts to render the level detector 3-10 inoperative. Therefore, the restraining voltage $|E_P|$ is deemed to be zero. When the magnitude of the restraining voltage $|E_R|$ of the waveform 9 exceeds the detection value $K_2$ of the level detector 3-10, the level detector 3-10 is actuated to generate a signal having such a waveform as the waveform R. The signal stretcher 3-11 operates instantaneously upon actuation of the level detector 3-10 and stretches the operating signal over a predetermined period of time even after disappearance of an input signal. Thus, it converts the operating signal into a signal having a continuous operating waveform similar to the waveform S.

As apparent from the above description, the auxiliary restraining/controlling output voltage $|E'_P|$ provided in order to improve the performance upon occurrence of an internal fault does not develop any problems or inconvenience when the degree of shift of its phase is kept below 90 degree and its magnitude is set at a suitable value. The auxiliary restraining/controlling output voltage $|E'_P|$ can readily cope with such an internal fault by setting the stretching time period of the signal stretcher 3-11 at a suitable level even where there is employed, similar to a drawback of conventional protective relays, such extreme countermeasure against the direct-current saturation of current transformers that no terminal restraining voltage $|E_T|$ is developed by the second or third wave. Besides, by composing one of the input transformers of each of the input transformer units by a gapped transformer, a countermeasure has been provided against dc components of the secondary currents of the current transformers. Thus, the problem of phase offset due to the time constants of devices in the units has been eliminated. Hence, it is absolutely unnecessary to worry about problems such as malfunction or delayed actuation due to unnecessary restraining outputs upon occurrence of an internal fault.

The above embodiment employed the maximum restraining method in which the terminal restraining voltage $|E_T|$ is rendered proportional to the maximum value out of the secondary currents of all the current transformers. It may however be feasible to employ the scalar sum restraining method in which the terminal restraining voltage $|E_T|$ is rendered equal to the sum of absolute values proportional respectively to the secondary currents of the current transformers.

As has been described above, the input transformer units can be reduced in size and simplified in structure because the terminal restraining input transformers of the input transformer units are composed of gapped transformers so as to avoid saturation of the input transformer units by dc-component currents contained in the secondary currents of the current transformers. The present invention has brought about another advantageous effect that it can provide a high-performance differential-type protective relay involving no danger of malfunction even when the dc-component current contained in a troubled current has long attenuating time and the degrees of saturation of the transformers are high.

What is claimed is:

1. A differential-type instantaneous value ratio protective relay which protects a bus of an electric power system, comprising:

current transformers provided with lines connected to the bus;

input devices connected to each of said current transformers, each of which input devices includes a first transformer, which is gapped and generates a first signal corresponding to each output from the current transformers, and a second transformer with rectifying means for subjecting each respective first signal to full wave rectification so as to produce a corresponding second signal;

first detection means capable of generating an output when the level of a differential output obtained by differential connection of the first signals is higher than a preset value;

means for generating a main controlling output voltage which has a full-wave rectified waveform and is proportional to a differential voltage obtained by the differential connection of the first signals;

means for producing an auxiliary controlling output voltage which has a full-wave rectified waveform, is proportional to the differential output obtained by the differential connection of the first signals and has been phase shifted through a predetermined angle from the phase of the first signals;

second detection means capable of generating an output when a value obtained by subtracting at an instantaneous value level a value equivalent to the sum of the maximum of the main and auxiliary controlling output voltages from the maximum or the scalar sum of the second signals is equal to or higher than a preset value; and gate means connected to the output terminals of the first and second detection means and for restraining the output of the first detection means while the outputs of the first and second detection means are supplied, the output of said gate means determining an external fault of said bus.

2. A relay as claimed in claim 1, further comprising signal stretching means for holding each output of the second detection means for over a time period in which the output of said current transformer is saturated, when the output has been generated from the second detection means.

3. A relay as claimed in claim 2, wherein the output circuit of the first transformer of each of said input devices is equipped with an output resistor having a tap for selecting the level of the output without varying the time constant of said output circuit.

* * * * *

UNITED STATES PATENT AND TRADEMARK OFFICE
CERTIFICATE OF CORRECTION

PATENT NO. : 4,670,811
DATED : June 2, 1987
INVENTOR(S) : Nobuo Eda

It is certified that error appears in the above-identified patent and that said Letters Patent is hereby corrected as shown below:

Column 4, line 55, "componeht" should be --component--.

Column 5, line 17, "differentialtype" should be --differential-type--.

Column 6, line 42, "ED" should be --$E_D$--;

line 45, after "rendered" insert --low--.

Column 8, line 1, in the equation, "$(|E'_p|+|E_p|)$" should be --$(|E_p|+|E'_p|)$--;

line 3, "$|E'_p|$ and $|E_p|$" should be --$|E_p|$ and $|E'_p|$--.

Signed and Sealed this

Eighth Day of December, 1987

Attest:

DONALD J. QUIGG

Attesting Officer

Commissioner of Patents and Trademarks